Sept. 13, 1932.  A. K. SELDEN, JR  1,876,767
COOLING OF DYNAMO ELECTRIC MACHINES Filed March 7, 1931

Inventor,
Andrew K. Selden, Jr.
By Samuel W. Balch
Attorney.

Patented Sept. 13, 1932

1,876,767

UNITED STATES PATENT OFFICE

ANDREW K. SELDEN, JR., OF ORANGE, NEW JERSEY, ASSIGNOR TO CROCKER-WHEELER ELECTRIC MANUFACTURING COMPANY, OF AMPERE, NEW JERSEY, A CORPORATION OF NEW JERSEY

COOLING OF DYNAMO-ELECTRIC MACHINES

Application filed March 7, 1931. Serial No. 520,765.

The object of this invention is to provide a dynamo-electric machine of enclosed type suitable for use where the air contains dust which would be injurious, or which contains corrosive or explosive vapors. A further object is to provide a compact form with effective heat exchange through the enclosing walls whereby the machine may have a high rating.

In the accompanying sheet of drawing which forms a part of this description,

Figure 1:
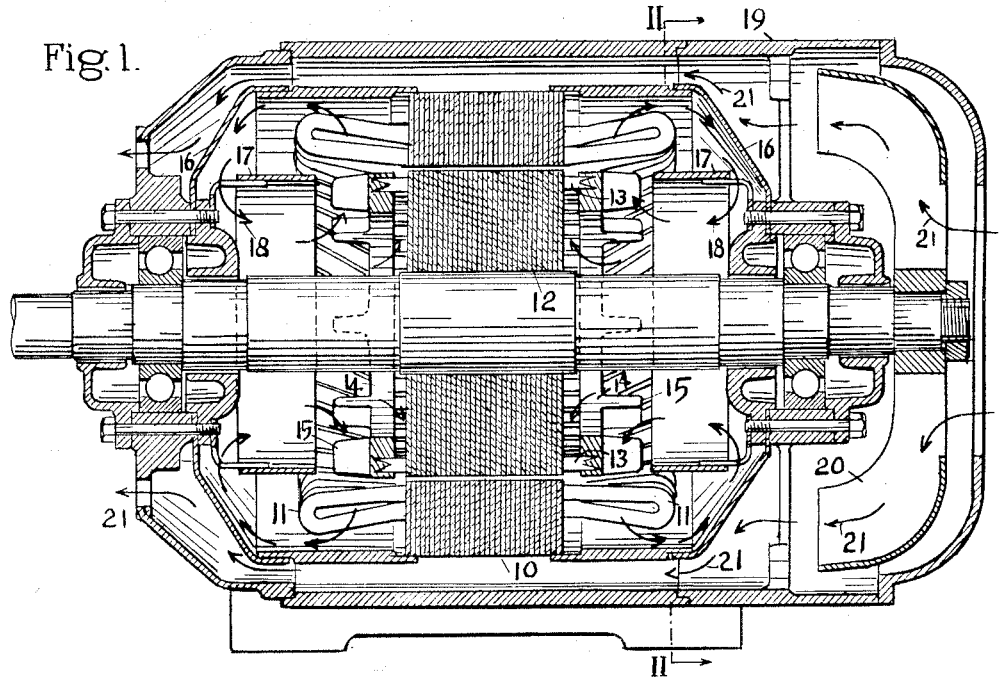
Figure 1 is a section through the axis of a squirrel-cage dynamo-electric machine which embodies this invention.
Figure 2:
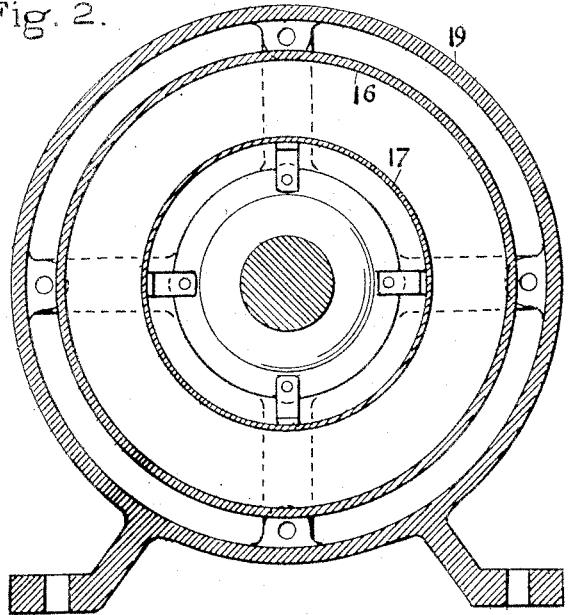
Fig. 2 is a transverse section on the line II—II of Fig. 1.

The dynamo-electric machine has a stator core 10 with stator windings having projecting portions 11 beyond the ends of the stator core. It also has a rotor core 12 with squirrel-cage bars having projecting portions 13 beyond the ends of the rotor core. The ends of the bars at each end are joined by an end ring 14 which is spaced from the core and carries fan blades 15 forming a fan so located with respect to the projecting portions of the stator windings that air will be driven radially directly against the stator windings.

The projecting portions of the squirrel-cage bars between the rotor core and the end rings also act as fan blades which cooperate with the fan blades on the end rings by which air is driven radially directly against the stator windings. A thin-walled end shield 16 encloses each end of the parts of the machine which require protection. An annular air-guide 17 is located between the squirrel-cage and the end shield and is spaced from the end shield whereby the air which is driven past the squirrel cage bars and past the fan blades on the end rings and past the projecting portions of the stator windings is caused to return along a path adjacent to the end shield where heat exchange is effected. Arrows 18 indicate the course of the circulating air within the machine. Outside of the enclosing casing is a second casing 19 which is open at the ends. A fan 20 draws in air at one end of the outer casing and is caused to pass over the end shields of the enclosing casing and the outer cylindrical surface of the stator core and is expelled at the other end of the machine. Arrows 21 indicate the course of this air.

I claim,

1. An enclosed dynamo-electric machine having a stator core with windings which project beyond the ends of the stator core, a rotor with a core and a squirrel-cage winding consisting of bars projecting beyond the ends of the rotor core and so located that they will act as a fan by which air will be driven radially directly against the stator windings, a thin-walled end shield, and an annular air-guide between the squirrel-cage and the end shield and spaced from the end shield whereby the air which is driven past the squirrel-cage and the stator windings is caused to return along a path adjacent to the end shield.

2. An enclosed dynamo-electric machine having a stator core with windings which project beyond the ends of the stator core, a rotor with a core and a squirrel-cage winding consisting of bars and end rings, fan blades carried by each end ring and so located with respect to the projecting portions of the stator windings that air will be driven radially directly against the stator windings, a thin-walled end shield, and an annular air-guide between the fan blades and the end shield and spaced from the end shield whereby the air which is driven past the windings is caused to return to the fan blades along a path adjacent to the end shield.

ANDREW K. SELDEN, JR.